United States Patent
Lindhardt

(10) Patent No.: US 10,654,230 B2
(45) Date of Patent: May 19, 2020

(54) METHODS OF FORMING A CORED COMPOSITE LAMINATE

(71) Applicant: The Boeing Company, Chicago, IL (US)

(72) Inventor: William Lindhardt, Bothell, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 15/688,068

(22) Filed: Aug. 28, 2017

(65) Prior Publication Data
US 2019/0061291 A1    Feb. 28, 2019

(51) Int. Cl.
| | |
|---|---|
| *B29C 70/68* | (2006.01) |
| *B29C 70/82* | (2006.01) |
| *B29D 99/00* | (2010.01) |
| *H02G 3/04* | (2006.01) |
| *B29C 33/48* | (2006.01) |
| *B29D 24/00* | (2006.01) |
| *B29C 67/00* | (2017.01) |
| *B29L 31/30* | (2006.01) |

(52) U.S. Cl.
CPC .......... *B29C 70/685* (2013.01); *B29C 33/485* (2013.01); *B29C 70/82* (2013.01); *B29D 24/00* (2013.01); *B29D 99/0021* (2013.01); *H02G 3/0437* (2013.01); *H02G 3/0462* (2013.01); *B29C 67/0011* (2013.01); *B29L 2031/3076* (2013.01)

(58) Field of Classification Search
CPC ..... B29C 70/685; B29C 65/00; B29C 33/485; B29C 70/82; B29C 67/0011; B29D 24/00; B29D 99/0021; H02G 3/0462; H02G 3/0437; B29L 2031/3076

See application file for complete search history.

(56) References Cited

U.S. PATENT DOCUMENTS

| | | | | |
|---|---|---|---|---|
| 4,675,061 | A * | 6/1987 | Mead | B29C 33/48 156/155 |
| 5,064,435 | A | 11/1991 | Porter | |
| 5,408,932 | A * | 4/1995 | Hesse | F42B 12/74 102/474 |
| 5,522,822 | A | 6/1996 | Phelps et al. | |
| 6,165,210 | A | 12/2000 | Lau et al. | |
| 7,582,109 | B2 * | 9/2009 | DeLegge | A61F 2/844 60/527 |
| 8,608,890 | B2 | 12/2013 | Everhart et al. | |
| 9,897,189 | B2 * | 2/2018 | Liang | F16H 49/001 |

* cited by examiner

*Primary Examiner* — John C Hong
(74) *Attorney, Agent, or Firm* — Perman & Green, LLP

(57) ABSTRACT

A method of forming a cored composite laminate, the method including forming a first recess in a first coupling surface of a first layer of the cored composite laminate, forming a second recess in a second coupling surface of a second layer of the cored composite laminate so that when the first layer of the cored composite laminate and the second layer of the cored composite laminate are coupled, the first recess and the second recess form a cavity through the cored composite laminate, and disposing a shape memory alloy member in the cavity, so that the shape memory alloy member supports the cored composite laminate during curing of the cored composite laminate.

20 Claims, 11 Drawing Sheets

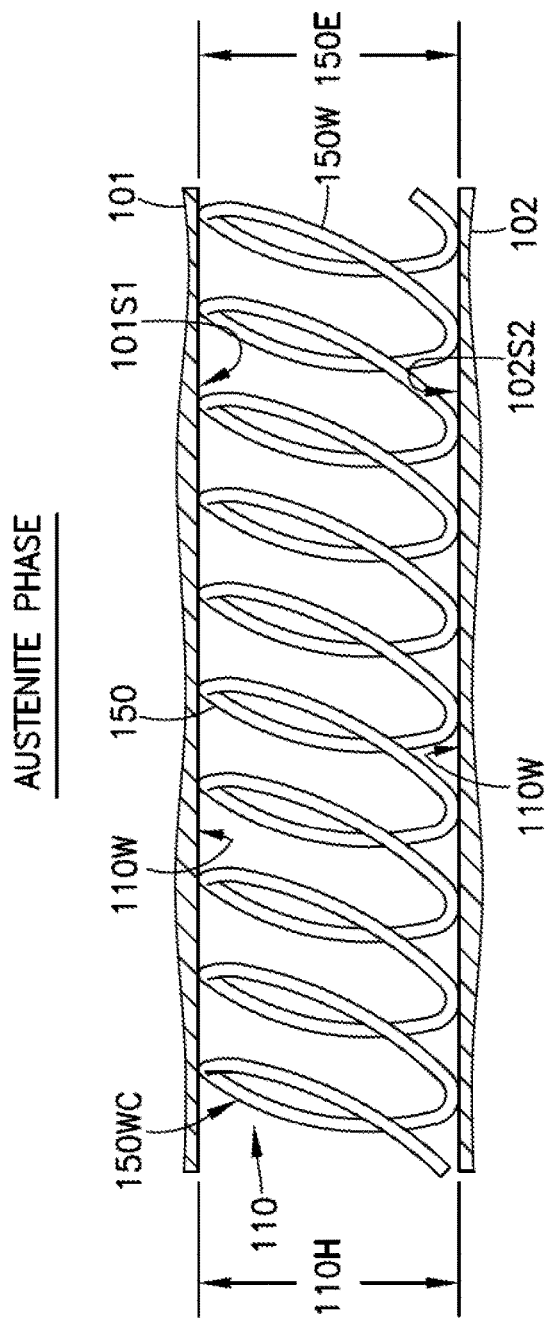
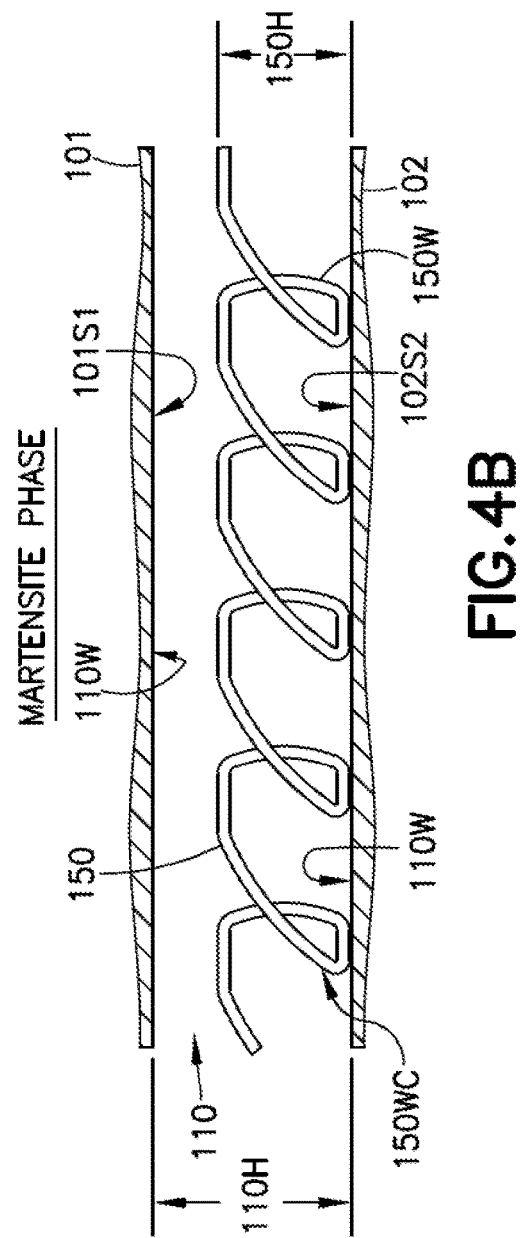

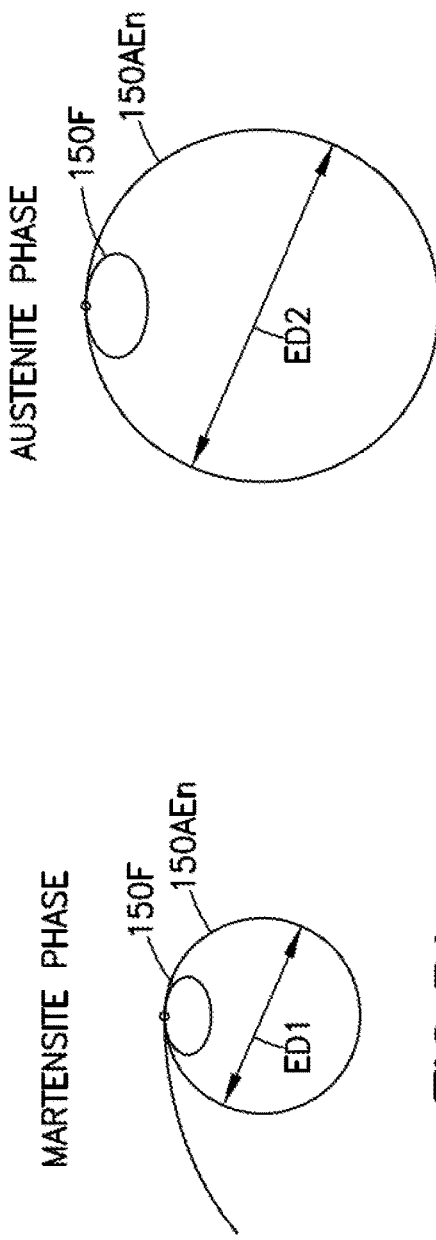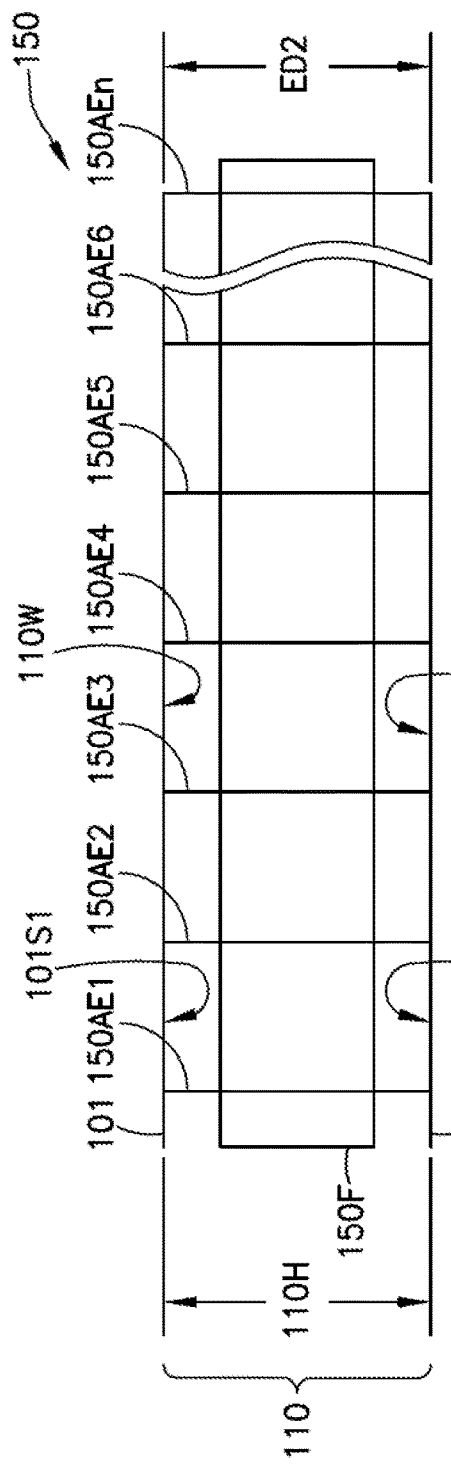

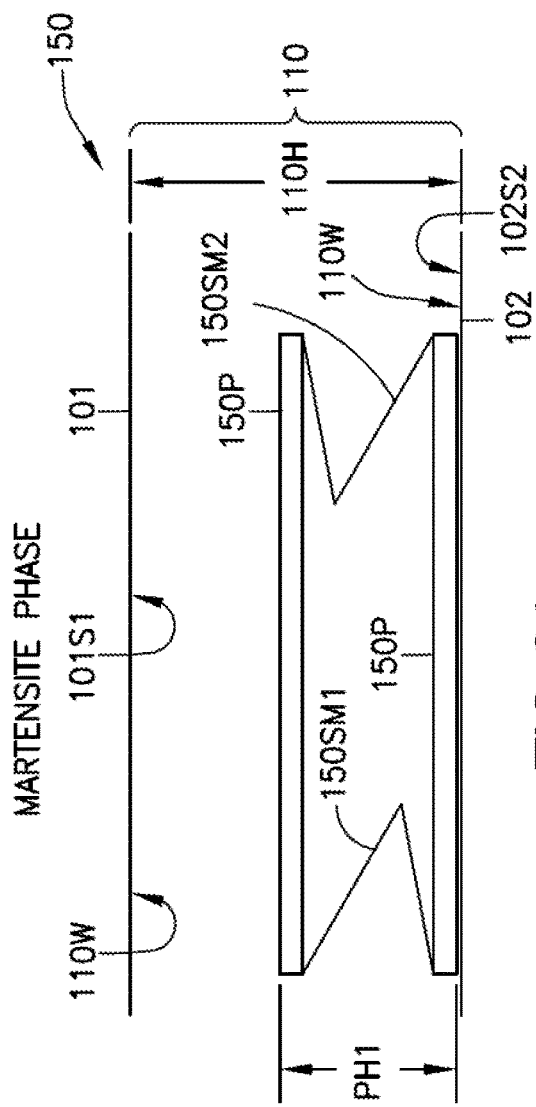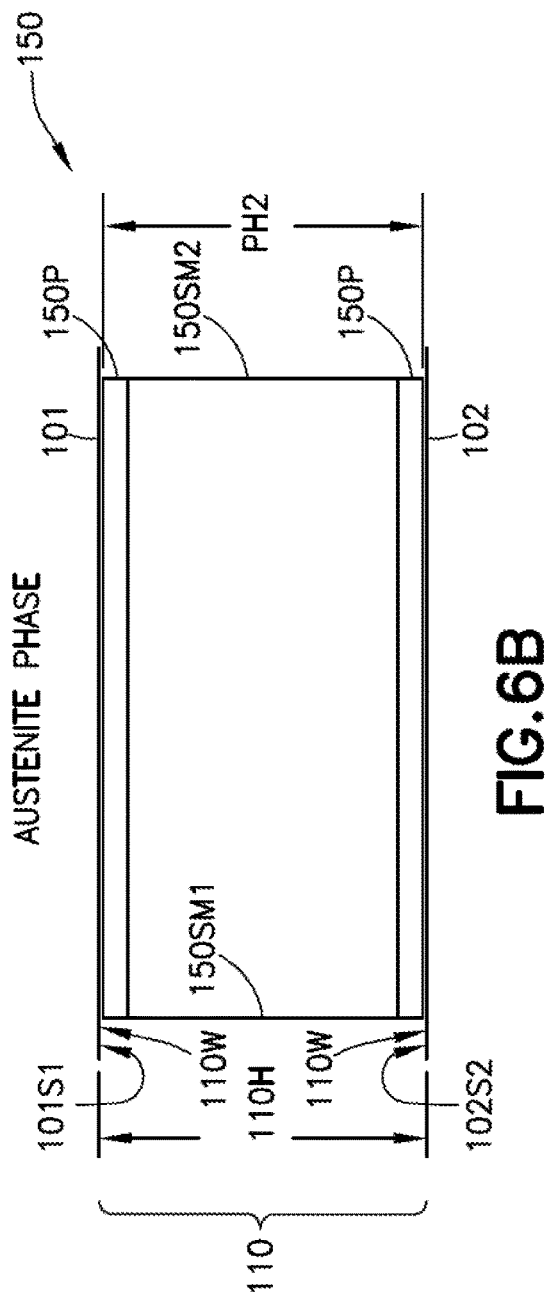

METHODS OF FORMING A CORED COMPOSITE LAMINATE

BACKGROUND

1. Field

The exemplary embodiments generally relate to support members and, in particular to shape memory members that provide support in a cavity defined in a composite laminate.

2. Brief Description of Related Developments

Routing wires through composite panels, such as in the aerospace industry, involves cutting channels into two panels and curing the two panels together. Curing the two panels together forms a composite panel with a wire-run channel in the core of the composite panel in which wires are routed. During the curing process, the two panels undergo high temperatures and pressure to bond the two panels together, forming the composite panel. During this process, the wire-run channel formed in the core of the composite panel is subject to collapsing or deforming from the pressure and/or heat, resulting in rework or total loss of the composite panel, which in turn increases production cost and time.

In order to prevent collapse or deformation of the wire-run channel, traditionally, support members made from honeycomb cores sized to fit the wire-run channel and having a friction-reducing coating were produced. These honeycomb cores are disposed in the channels cut into the two panels, before curing, to support the wire-run channel during curing. After curing the two panels together, the honeycomb core is removed. Removal of the honeycomb core support members however, may be timely and difficult as the honeycomb core becomes compressed between the two panels. During removal of the honeycomb core, the wire-run channel and the composite panel are potentially subject to damage and/or deformation. Further, the honeycomb cores are not capable of conforming to complex shapes of the wire-run channel (i.e., when the wire-run channel is not a substantially straight channel). This lack of conformity increases risk of wire-run channel collapse or deformation.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a method of forming a cored composite laminate, the method including forming a first recess in a first coupling surface of a first layer of the cored composite laminate, forming a second recess in a second coupling surface of a second layer of the cored composite laminate so that when the first layer of the cored composite laminate and the second layer of the cored composite laminate are coupled, the first recess and the second recess form a cavity through the cored composite laminate, and disposing a shape memory alloy member in the cavity, so that the shape memory alloy member supports the cored composite laminate during curing of the cored composite laminate.

Another example of the subject matter according to the present disclosure relates to a method of forming a cored composite laminate having at least a first layer and a second layer of a compressible material, the method including disposing a shape memory alloy member into a cavity formed by the first layer and the second layer, heating the first layer, the second layer, and the shape memory alloy member, where the shape memory alloy member is configured so that as the shape memory alloy member is heated, the shape memory alloy member engages and supports inner walls of the cavity, and removing the shape memory alloy member from the cavity after cooling the first layer, the second layer, and the shape memory alloy member.

Still another example of the subject matter according to the present disclosure relates to a method for internally supporting a cored composite laminate having at least a first layer and a second layer of compressible material, the method including disposing a shape memory alloy member into a cavity formed by the first layer and the second layer, and heating the cored composite laminate and the shape memory alloy member so that the shape memory alloy member engages and supports inner walls of the cavity as the first layer and the second layer are compressed to engage each other in a curing process.

BRIEF DESCRIPTION OF THE DRAWINGS

Figure 1:
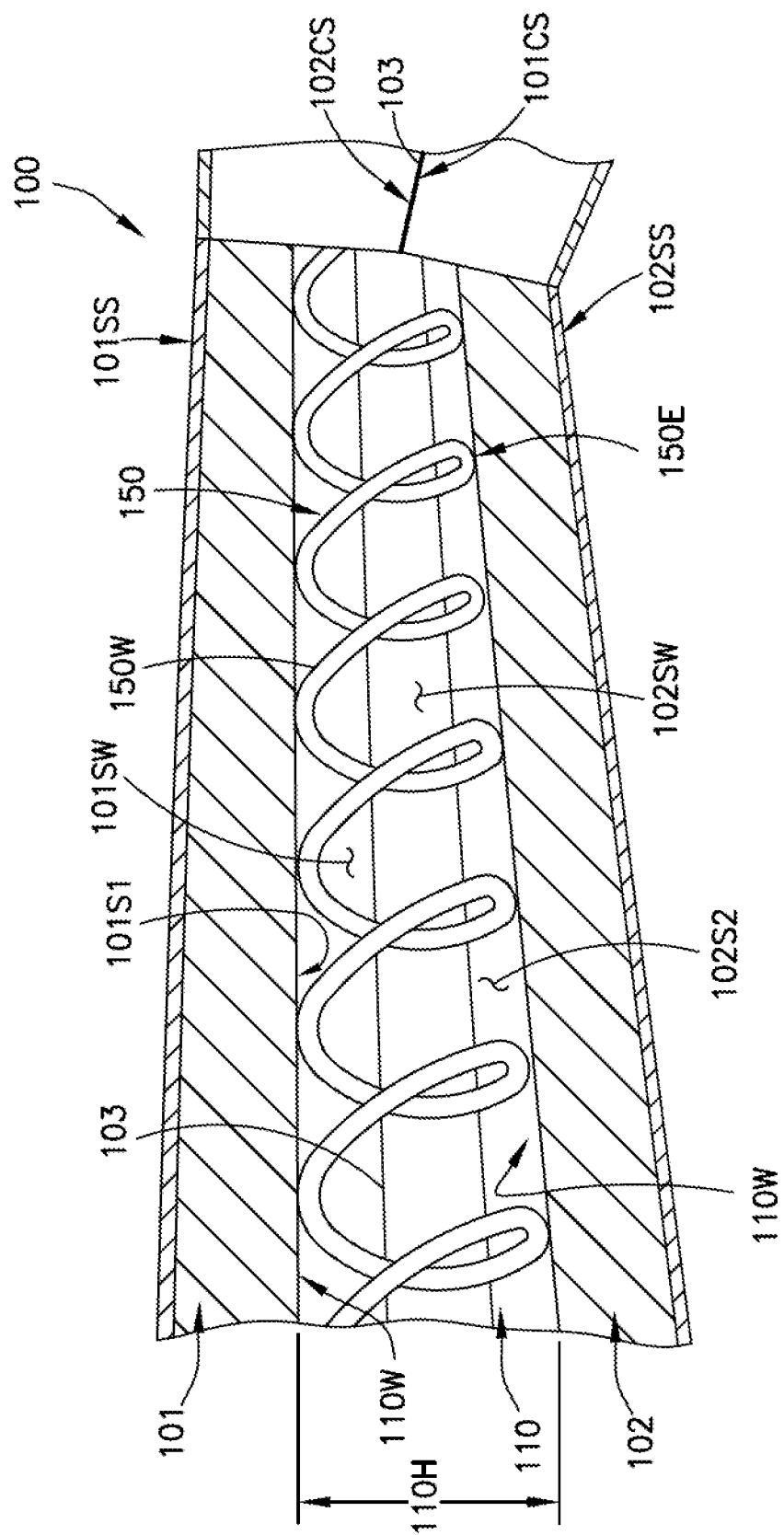
Figure 2:
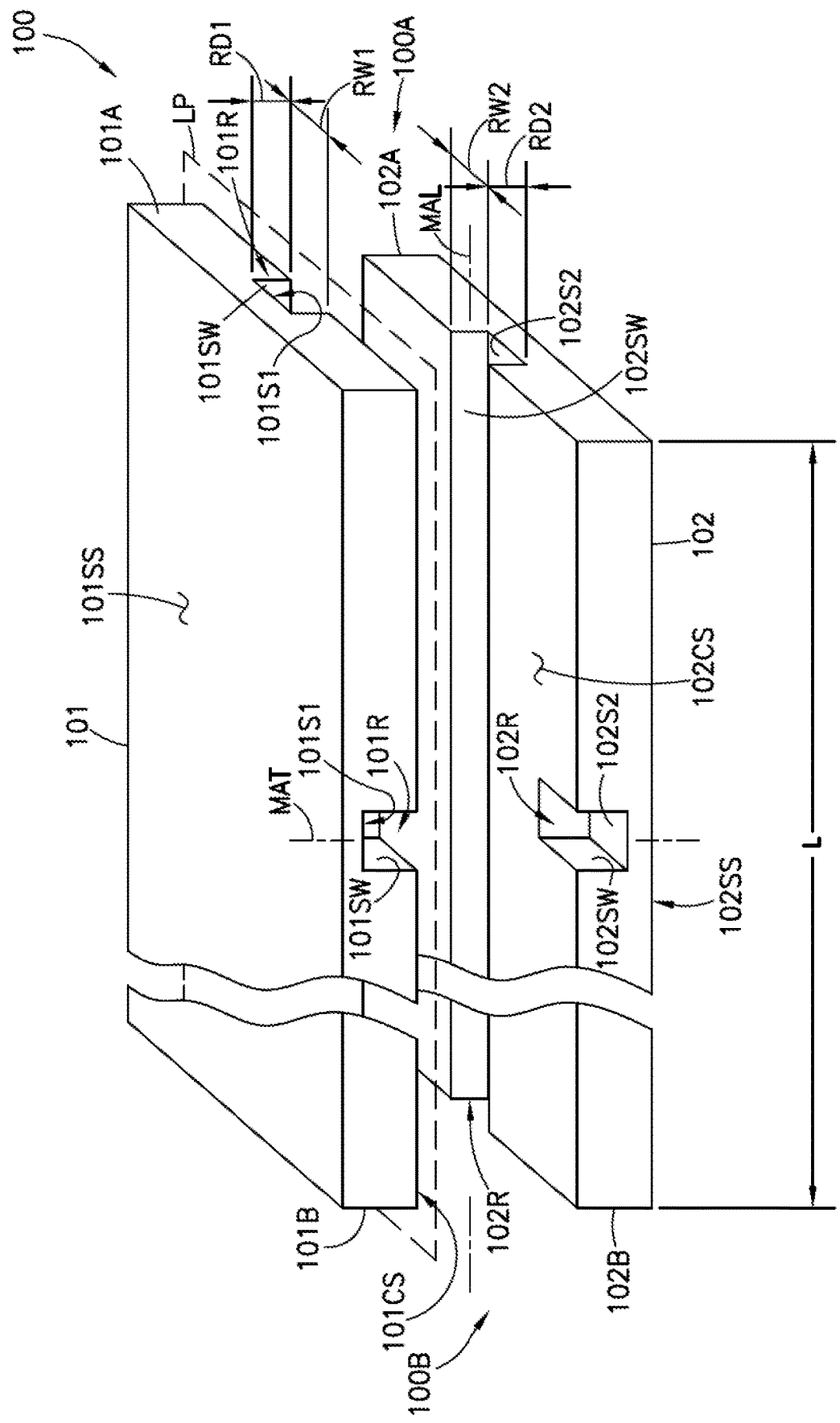
Figure 3B:
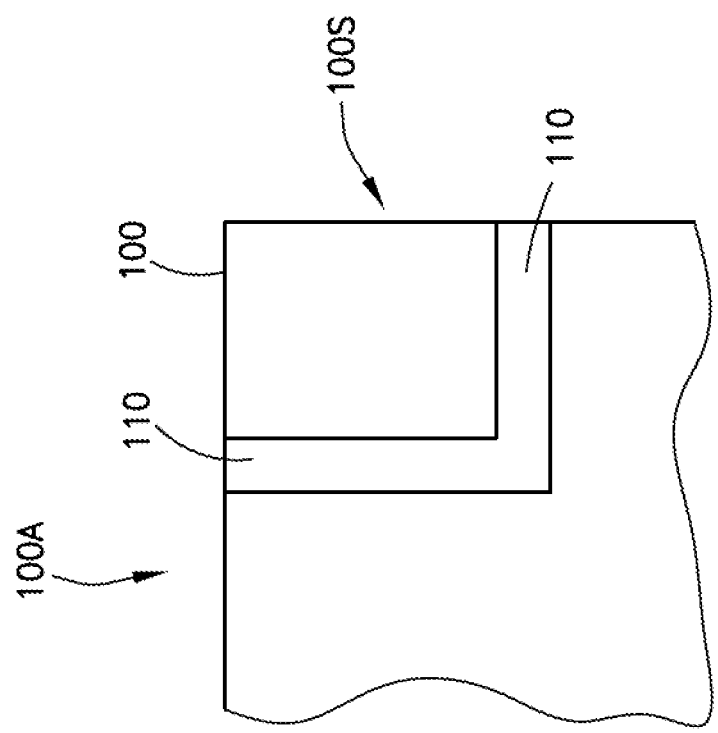
Figure 3A:
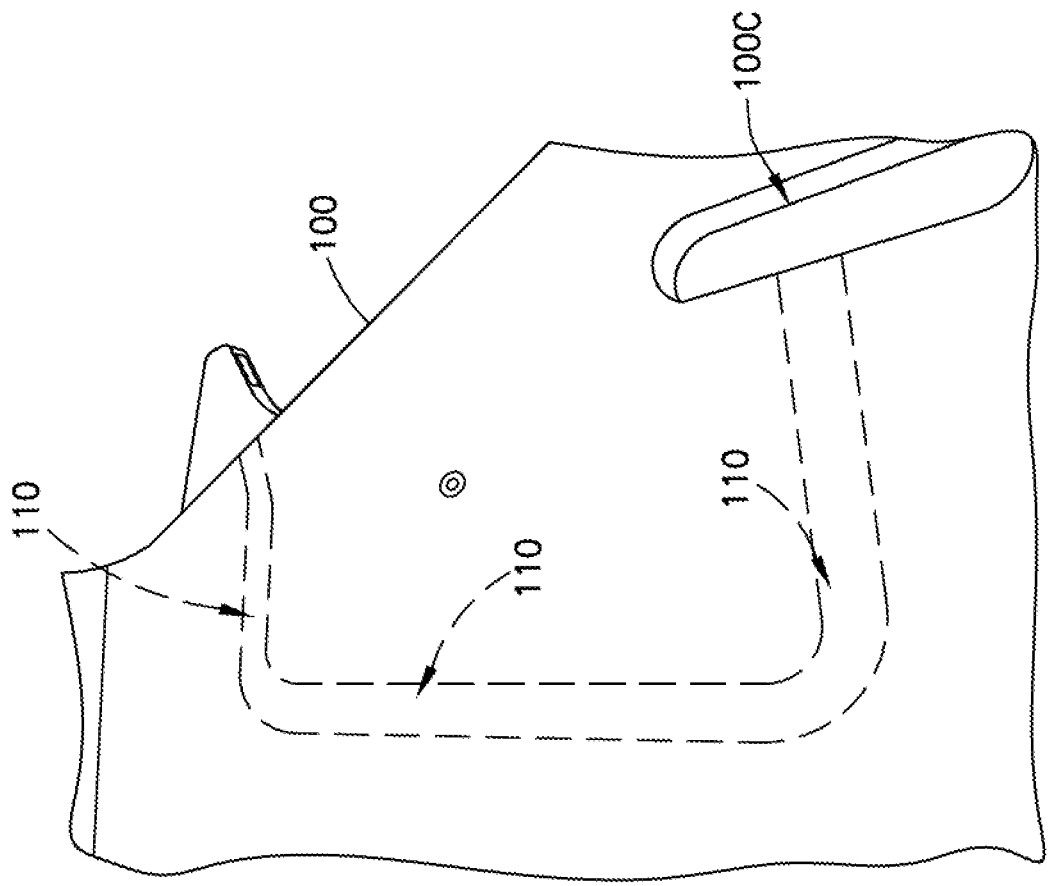
Figure 7:
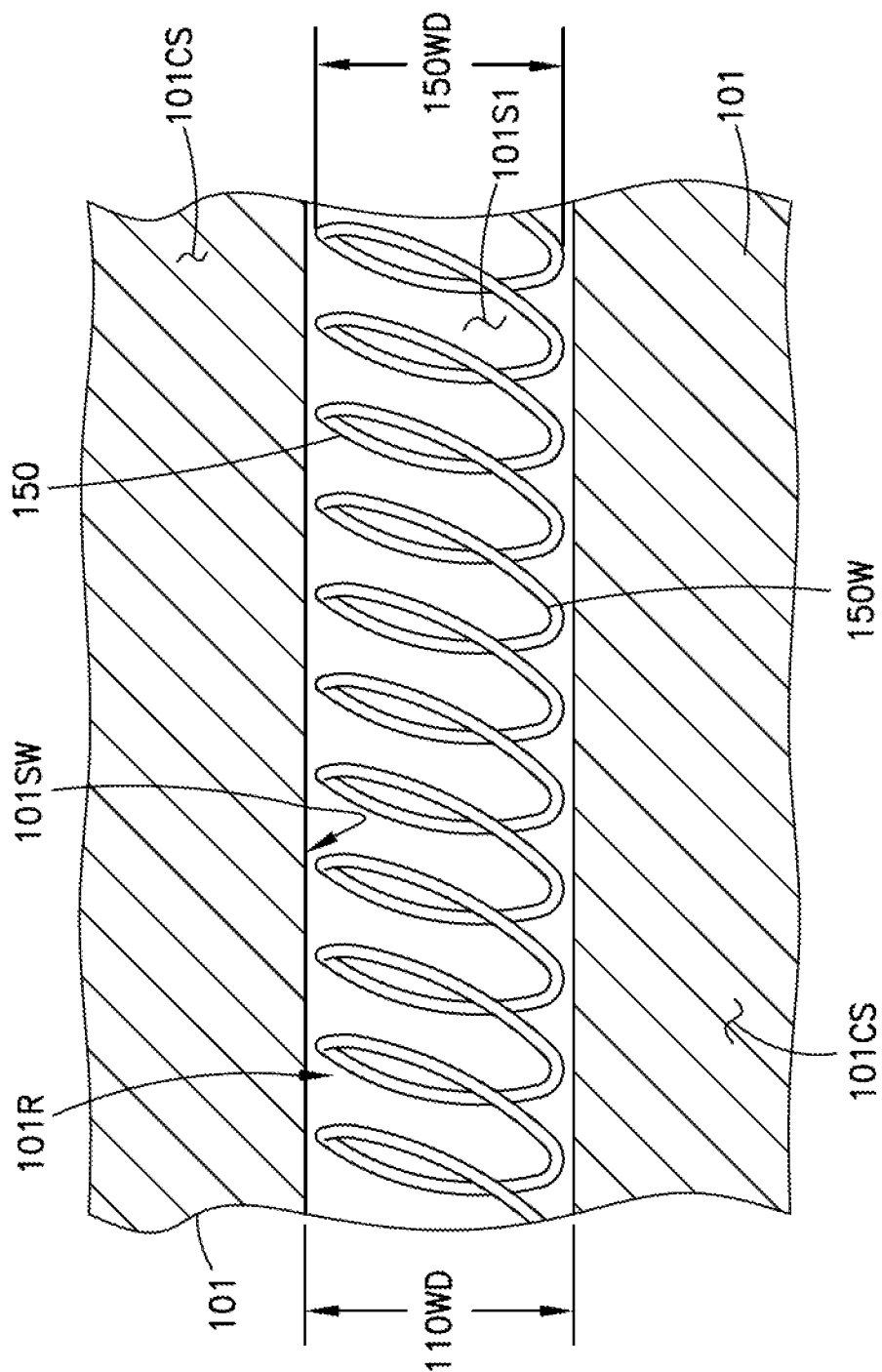
Figure 8:
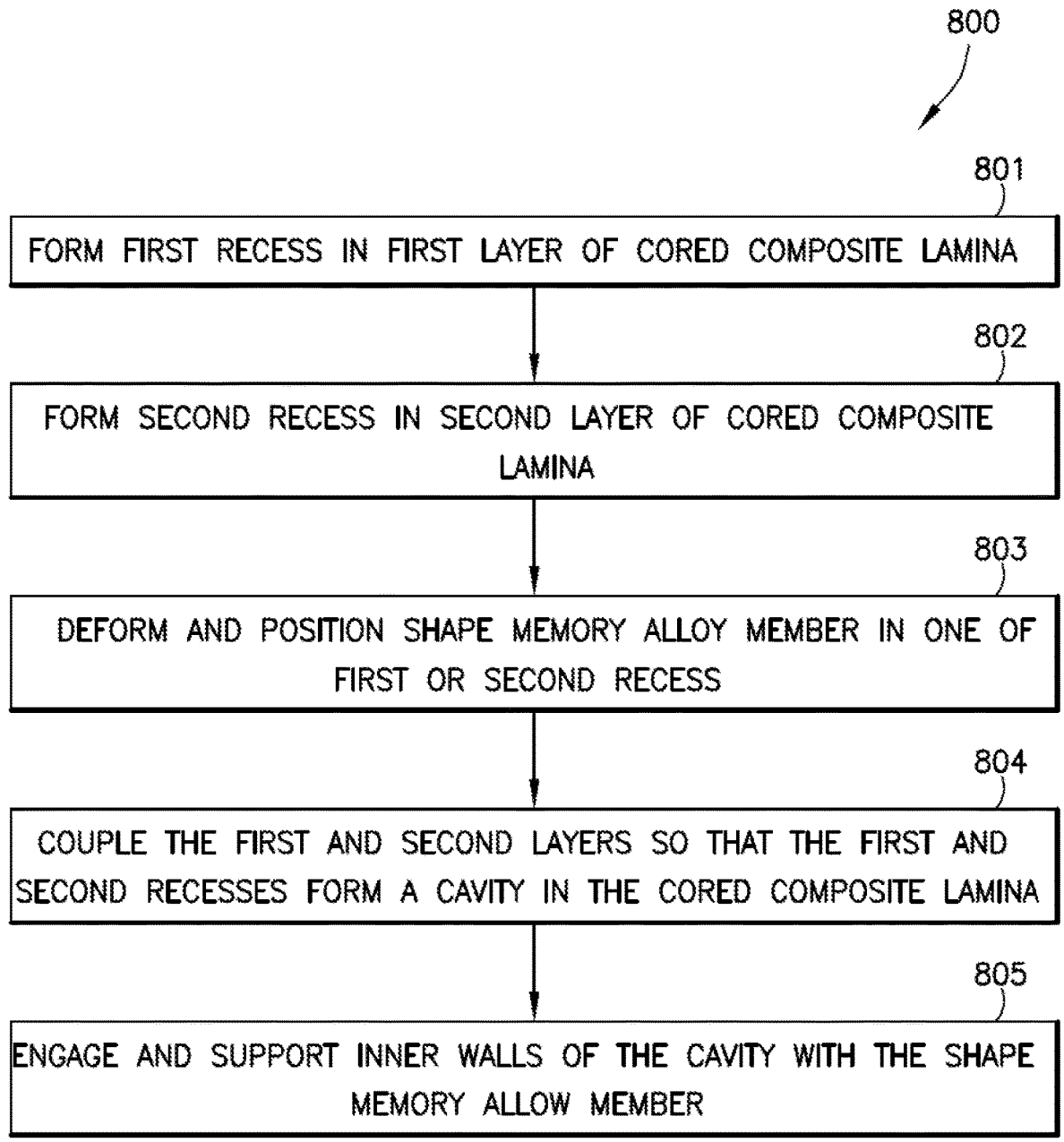
Figure 9:
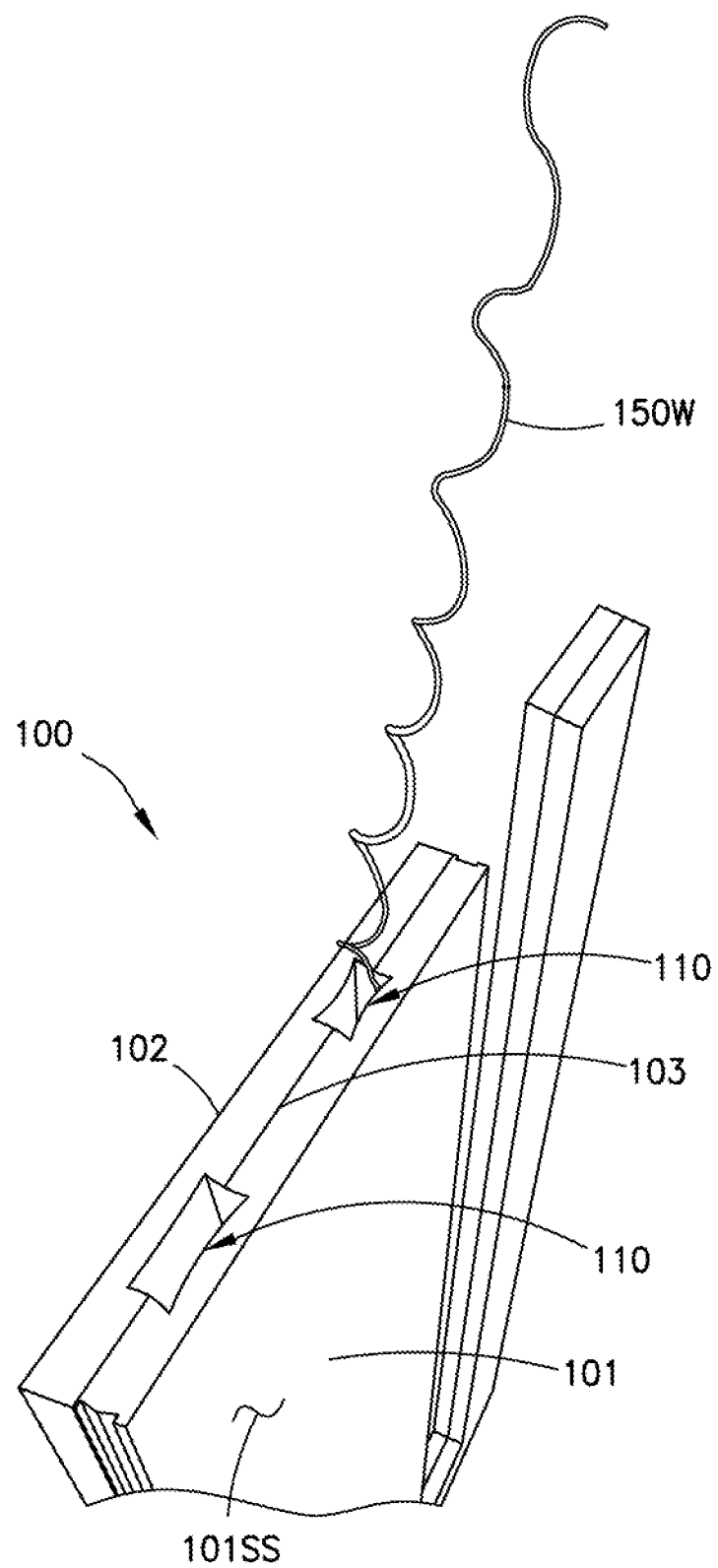
Figure 10:
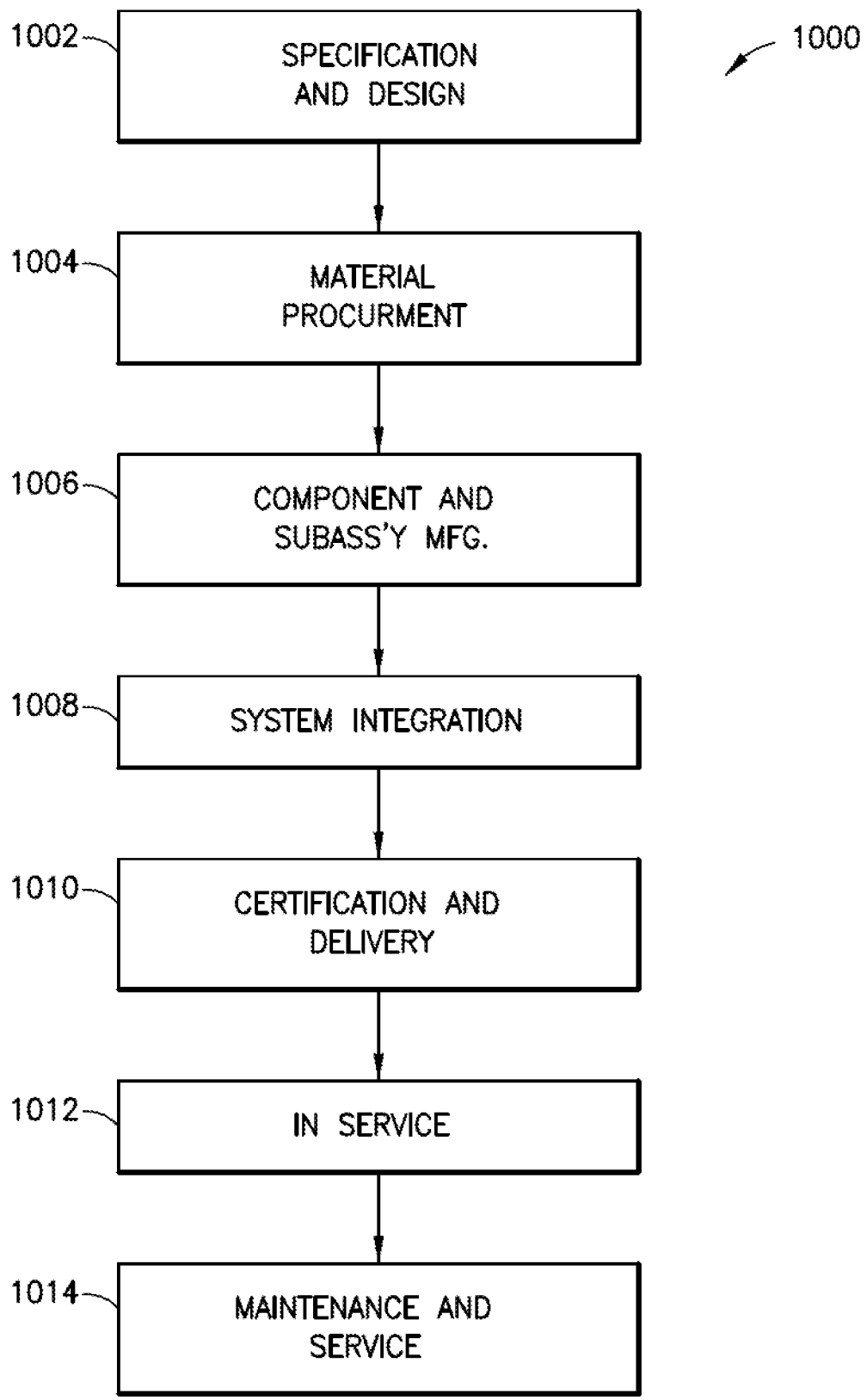

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a side cross-sectional perspective view of portions of a cored composite laminate and a shape memory alloy member in accordance with one or more aspects of the present disclosure;

FIG. 2 is a top perspective exploded illustration of a cored composite laminate in accordance with one or more aspects of the present disclosure;

FIG. 3A is a top perspective illustration of portions of a cored composite laminate in accordance with one or more aspects of the present disclosure;

FIG. 3B is a top view of portions of a cored composite laminate in accordance with one or more aspects of the present disclosure;

FIG. 4A is a side cross-sectional view of a portion of a cored composite laminate and a shape memory alloy member in an austenite phase in accordance with one or more aspects of the present disclosure;

FIG. 4B is a side cross-sectional view of a portion of the cored composite laminate and the shape memory alloy member of FIG. 4A in a martensite phase in accordance with one or more aspects of the present disclosure;

FIG. 5A is a front view of a portion of a shape memory alloy member accordance with one or more aspects of the present disclosure;

FIG. 5B is a front view of the portion of the shape memory alloy member of FIG. 5A in an austenite phase in accordance with one or more aspects of the present disclosure;

FIG. 5C is a side view of the shape memory alloy member of FIG. 5B in accordance with one or more aspects of the present disclosure;

FIG. 6A is a side view of a shape memory alloy member in a martensite phase in accordance with one or more aspects of the present disclosure;

FIG. 6B is a side view of the shape memory alloy member of FIG. 6A in an austenite phase in accordance with one or more aspects of the present disclosure;

FIG. 7 is a top perspective view of portions of a cored composite laminate and a shape memory alloy member in accordance with one or more aspects of the present disclosure;

FIG. 8 is a flow chart of a method of forming the cored composite laminate in accordance with one or more aspects of the present disclosure;

FIG. 9 is a top perspective view of portions of a cored composite laminate and a shape memory alloy member in accordance with one or more aspects of the present disclosure;

FIG. 10 is a flow chart of an aircraft production and service methodology; and

Figure 11:
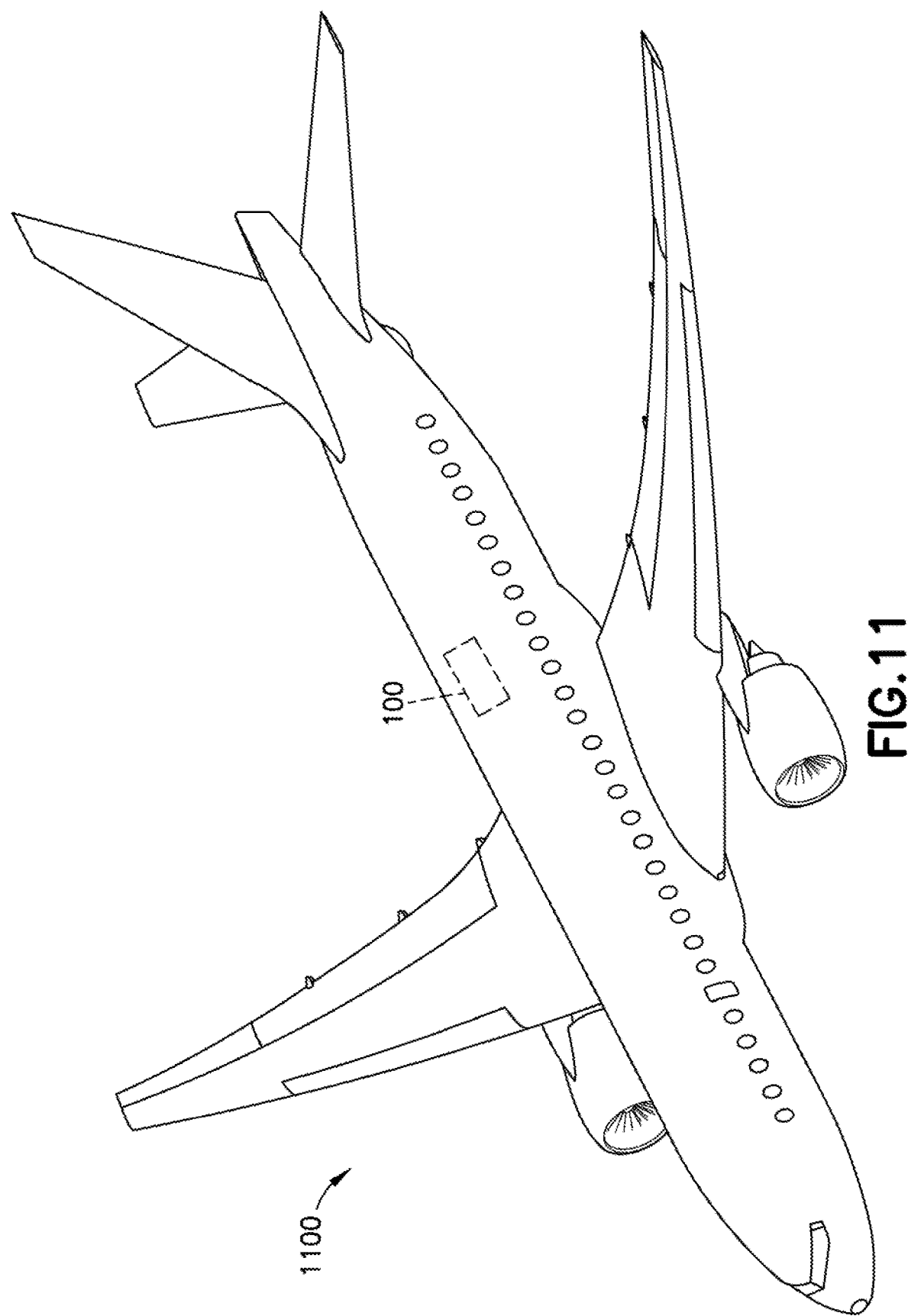

FIG. 11 is a schematic illustration of an aircraft in accordance with one or more aspects of the present disclosure.

DETAILED DESCRIPTION

The aspects of the present disclosure described herein provide a method of forming a cored composite laminate 100, having a cavity 110 therein for routing wires. In other aspects, the cavity 110 may be a fluid passage, a passageway for any suitable mechanical linkage, or may be a removal of material to reduce weight of the cored composite laminate 100. A support member in the form of a shape memory alloy member 150 is employed within the cavity 110 to support the cavity 110 during formation of the cored composite laminate 100. For example, the shape memory alloy member 110 supports walls 110W that define the cavity 110 by applying a force to the walls 110W when heat and/or pressure are applied to the cored composite laminate 100. As will be described herein, the shape memory alloy member 150 is configured to support the walls 110W of the cavity 110 such that, for example, walls 110W, and thus the cavity 110, are substantially prevented from collapsing or deforming during the formation of the cored composite laminate 100. Further, the shape memory alloy member 150 may be easily removed from the cavity 110, compared to, e.g., the conventional honeycomb core, substantially without marring or marking of the cored composite laminate 100. The method of forming the cored composite laminate 100 described herein also provides for the formation of the cavity 110 in complex shapes, such shapes having one or more curves, bends, and/or angles. The cored composite laminate 100 formed using the methods and support members described herein can be used as or in a panel in an aircraft 1100. Illustrative, non-exhaustive examples, which may or may not be claimed, of the subject matter according to the present disclosure are provided below.

Referring to FIGS. 1 and 2, in one aspect, the cored composite laminate 100 generally includes a first layer 101 having a first coupling surface 101CS and a first recess 101R, and a second layer 102 having a second coupling surface 102CS and a second recess 102R. In one aspect, the first layer 101 and the second layer 102 may have any suitable skin 101SS, 102SS coupled to the respective first layer 101 and second layer 102 opposite the respective first coupling surface 101CS and second coupling surface 102CS. In one aspect, the first layer 101 and the second layer 102 are generally formed from the same material, for example, one or more of a foam material, composite, or any other suitable material. In one aspect, the first layer 101 and the second layer 102 may each be formed from a different material.

Generally, the first layer 101 and the second layer 102 are configured to couple to one another along an interface 103 so as to form the cored composite laminate 100. The interface 103 may be defined by the first coupling surface 101CS and the second coupling surface 102CS so as to extend between a first end 100A of the cored composite laminate 100 and a second end 100B of the cored composite laminate 100 along one or more planes LP, such as longitudinal planes. While a single plane LP is illustrated, in other aspects there may be more than one plane LP so that the interface 103 is a three dimensional interface having any suitable contour.

Still referring to FIGS. 1 and 2, in one aspect, the first recess 101R of the first layer 101 extends from a first end 101A of the first layer 101 to a second end 101B of the first layer 101; while in other aspects, the first recess 101R may extend any distance along the first layer 101 and in any suitable direction. For example, the first recess 101R may extend from the first end 100A of the cored composite laminate 100 to a side 100S (see FIG. 3B) of the cored composite laminate 100. In another example, the first recess 101R may extend from the first end 100A to a channel 100C (see FIG. 3A) cut into any suitable portion of the cored composite laminate 100. The channel 100C may be configured to receive a fluid outlet (e.g., for cabin air conditioning), an instrument panel, lighting, etc. where wires and/or fluid is provided to the channel 100C through the cavity 110. In one aspect, the first recess 101R may include any suitable curve, bend, or angle (i.e., the first recess 101R may not be straight so as to form an arcuate or convoluted path). The first recess 101R includes a first surface 101S1 (i.e., a portion of the inner walls of the cavity 110), first sidewalls 101SW, a width RW1, and a depth RD1. In one aspect, the width RW1 and/or the depth RD1 of the first recess 101R may be substantially uniform, while in other aspects, the width RW1 and/or the depth RD1 of the first recess 101S may vary along a length L of the cavity 110.

In one aspect, the second recess 102R of the second layer 102 extends from a first end 102A of the second layer 102 to a second end 102E of the second layer 102 while in other aspects, the second recess 102R may extend any distance along the second layer 102 and in any suitable direction substantially similar to that described above with respect to the first recess 101R. The second recess 102R includes a second surface 102S2 (i.e., another portion of the inner walls of the cavity 110), second sidewalls 102SW, a width RW2, and a depth RD2. Substantially similar to the first recess 101R, the width RW2 and/or the depth RD2 of the second recess 102R may be substantially uniform, while in other aspects, the width RW2 and/or the depth RD2 may vary along the length L of the cavity 110.

In one aspect, each width RW1, RW2 and depth RD1, RD2 of the first and second recesses 101R, 102R corresponds to dimensions of one or more wires to be routed through the cavity 110. In one aspect, one or more of the depths RD1, RD2 define a height 110H of the cavity 110 when the first layer 101 and the second layer 102 are coupled to each other. In one aspect, the depth RD1 of the first recess 101R may be different than the depth RD2 of the second recess 102R. In one aspect, the first layer 101 may include the first recess 101R while the second layer 102 does not include the second recess 102R (i.e., a depth RD2 of zero) or vice versa. For example, the cavity 110 is formed from but one of the first recess 101R and the second recess 102R where the other one of the first recess 101R and the second recess 102R has a negligible or no depth (i.e., the respective first and second coupling surfaces 101CS, 102CS lacks a recess 101R, 102R). In one aspect, the first and second recesses 101R, 102R may have a major axis MAL that extends along the longitudinal plane LP of the cored composite laminate 100. In other aspects, the first and second recesses 101R, 102R may have a major axis MAT that extends transverse to the longitudinal plane LP of the cored composite laminate 100. In one aspect, the first and second recesses 101R, 102R may have substantially the same shape such that the first and second recesses 101R, 102R are mirror images of one another. The first and second recesses 101R, 102R being mirror images of one another provides for alignment of the first and second recesses 101R, 102R when the first layer 101 couples to the second layer 102 to form the cavity 110.

In one aspect, the first layer 101 and the second layer 102 couple to one another, such that the first and second recesses 101R, 102R define the cavity 110. As the first and second recesses 101R, 102R define the cavity 110, the first and second recesses 101R, 102R also define the pathway of the cavity 110. For example, as noted above with respect to the first and second recesses 101R, 102R, the cavity 110 may extend from the first end 100A to the second end 100B of the cored composite laminate 100, may extend from the first end 100A to the channel 100C cut into any suitable portion of the cored composite laminate 100 (see FIG. 3A), or may extend from the first end 100A to a side 100S of the cored composite laminate 100 (see FIG. 3B) and may include any suitable curve, bend, or angle.

Still referring to FIGS. 1 and 2, as noted above, the first and second layers 101, 102 may include any suitable skin 101SS, 102SS coupled thereto. In one aspect, the first and second layers 101, 102 are configured for coupling to the skin 101SS, 102SS, such as a lamina, which may provide protection for the first and second layer 101, 102 of the cored composite laminate 100 from mailing or markings. The skin 101SS, 102SS may also provide stiffness to the first and second layers 101, 102. In one aspect, the skin 101SS, 102SS may be coupled to only one of the first and second layers 101 102.

Referring now to FIGS. 1, 4A-4B, 5A-5C, and 6A-6B, in one aspect, the shape memory alloy member 150 generally includes at least one piece of wire 150W formed of a metallic alloy. For example, the metallic alloy may be a combination of metals including about 50% titanium and about 50% nickel (e.g., Nitinol). In other examples, the metallic alloy may be a combination of copper, aluminum, and nickel; a combination of copper, zinc, aluminum; a combination iron, manganese, silicon alloys; other combinations of titanium and nickel; or a combination of any other suitable elements that form a metallic alloy.

The shape memory alloy member 150 may be firmed or shaped in any manner. The shape memory alloy member 150 may have any suitable cross-section for providing support to the first surface 101S1 and the second surface 102S2 of recesses 101R, 102R that define the cavity 110. For example, in one aspect, the cross section of the shape memory alloy member 150 may be circular, square, triangular, or any other suitable shape to support the first and second surfaces 101S1, 102S2 from collapsing or deforming. The shape memory alloy member 150 is configured to have a first shape in an austenite phase and a second shape in a martensite phase. The shape memory alloy member 150 is configured to transition from one phase to the other upon heating or cooling of the shape memory alloy member 150 to change between the first shape and the second shape. For example, the shape memory alloy member 150 may be pre-programmed by heat treating the shape memory alloy member 150 so that the shape memory alloy member 150 has a desired shape when in the austenite and/or martensite phase.

The shape memory alloy member 150 is shaped into the desired shape before being heat treated in one or more of the austenite and martensite phase to "remember" or be programmed into that particular shape as described herein for the respective phase.

The martensite phase of the shape memory alloy member 150 is generally obtained at lower temperatures that are less than a predetermined transition temperature, e.g., less than about 130 degrees Fahrenheit (about 54 degrees Celsius) or any other suitable transition temperature. While in the martensite phase, the shape memory alloy member 150 is malleable and may be deformed into any desired shape. In the martensite phase, the shape memory alloy member 150 may be shaped for positioning in or removal from the cavity 110 of the cored composite laminate 100 as described herein.

The austenite phase of the shape memory alloy member 150 is generally obtained at higher temperatures that are greater/higher than the predetermined transition temperature, e.g., more than about 130 degrees Fahrenheit (about 54 degrees Celsius) or any other suitable transition temperature. While in the austenite phase, portions of the shape memory alloy member 150 transitions into a pre-programmed shape as will be described below. Transitioning into the pre-programmed shape generally includes the shape memory alloy member 150 stiffening (i.e., unmalleable) to provide support to the cavity 110 (i.e., to the walls 110W defining the cavity 110) during curing of the cored composite laminate 100. The wire 150W may be configured so that in the austenite phase, the force exerted on the first and second layer 101, 102 is sufficient to substantially prevent collapse (e.g., provides support) of the walls 110W defining the cavity 110 but may not be strong enough to substantially deform the first and second layer 101, 102.

For example, referring to FIGS. 4A-4B, the shape memory alloy member 150 may be the wire 150W formed into a helically coiled wire 150WC at least in the austenite phase. The wire 150W in the martensite phase may be deformed such as flattened and/or bent into any suitable shape to be positioned in or removed from the cavity 110 (see FIG. 4b) prior to coupling the first and second layer 101, 102 to each other. For example, the wire 150W may be shaped so that the height 150H and width 150WD of the wire 150W is/are less than a height 110H and width 110WD of the cavity 110. The wire 150W may be heat treated such that when the wire. 150W transitions into the austenite phase, the wire 150W stiffens into the helically coiled wire 150WC (see FIG. 4A) to support the cavity 110 during curing of the cored composite laminate 100. In the austenite phase, the helically coiled wire 150WC has programmed outer diameter 150E that is substantially equal to or greater than the height 110H of the cavity so that the wire 150W is in substantial contact with the first and second surfaces 101S1, 102S2. The outer diameter 150E of the helically coiled wire 150WC being equal to or greater than the height 110H of the cavity 110 allows the helically coiled wire 150WC to support the first and second surfaces 101S1, 102S2 so that the first and second surfaces 101S1, 102S2 do not collapse or deform.

In another example, referring to FIGS. 5A-5C, the shape memory alloy member 150 may include a flexible tube 150F having an array of shape memory alloy elements 150AE1-150AEn coupled to the flexible tube 150F. The flexible tube 150F may or may not be constructed of a shape memory alloy. The array of shape memory alloy elements 150AE1-150AFn may be coupled to the flexible tube 150F in any suitable manner, such as, mechanically or chemically. In the martensite phase, each of the shape memory alloy elements 150AE1-150AEn may have a diameter EDI which is less than a height 110H and width 110WD of the cavity 110. The shape memory alloy elements 150AE1-150AEn may be deformed and bend the flexible tube 150F so that the flexible tube 150F and array of shape memory alloy elements 150AF1-150AEn may be inserted into and positioned in the cavity 110. When the flexible tube 150F and/or or the array of shape memory alloy elements 150AE1-150AEn transition to the austenite phase (FIGS. 5B-5C), each of the shape memory alloy elements 150AF1-150AEn stiffen and each diameter increases to a diameter ED2. The diameter ED2 may be equal to or greater than a height. 110H and/or width 110WD of the cavity 110. As noted before, the diameter ED2 of each of the shape memory alloy elements 150AE1-150AEn being equal to or greater than the height 110H and/or width 110WD of the cavity 110 allows the array of shape memory alloy elements 150AE1-150AEn to support the first and second surfaces 101S1, 102S2 so that the first and second surfaces 101S1, 102S2 do not collapse or deform.

In yet another example, referring to FIGS. 6A-6B, the shape memory alloy member 150 may include plates 150P coupled to each other with one or more shape memory alloy elements 150SM1-150SM2. The one or more shape memory alloy elements 150SM1-150SM2 may be substantially similar to the wire 150W or have any other suitable geometrical configuration. In the martensite phase, the plates are spaced apart a distance PH1 (i.e., a height between the plates 150P is distance PH1) that is less than the height 110H and/or width 110WD of the cavity 110 so that the plates 150P coupled to each other with the one or more shape memory alloy elements 150SM1-150SM2 may be collapsed for inserting and positioning the shape memory alloy member 150 in the cavity 110. When the one or more shape memory alloy elements 150SM1-150SM2 transitions into the austenite phase, the one or more shape memory alloy elements 150SM1-150SM2 stiffen such that the plates 150P are moved away from each other so the distance between the plates 150P increases to a distance PH2 that is equal to or greater than a height 110H of the cavity 110. The distance PH2 between the plates 150P, which are coupled to each other with one or more shape memory alloy elements 150SM1-150SM2, being equal to or greater than the height 110H of the cavity 110 allows the plates 150P coupled to each other with one or more shape memory alloy elements 150S1-150SM2 to support the first and second surfaces 101S1, 102S2 so that the first and second surfaces 101S1, 102S2 do not collapse or deform.

While the shape memory alloy member 150 is described above as being programmed to a predetermined shape while in the austenite phase, in other aspects, the shape memory alloy member 150 may also be programmed to another predetermined shape while in the martensite phase. For example, the shape memory alloy member 150 may be programmed to return to a size and shape that moves the shape memory alloy member 150 away from the inner walls of the cavity 110 to allow removal of the shape memory alloy member 150 from the cavity 110.

Referring now to FIGS. 1, 8, and 9, a method 800 for forming the cored composite laminate 100 is illustrated. In one aspect, the first recess 101R is formed in the first coupling surface 101CS of the first layer 101 of the cored composite laminate 100 (FIG. 8, Block 801). The second recess 102R is formed in the second coupling surface 102CS of the second layer 102 of the cored composite laminate 100 (FIG. 8, Block 802). The shape memory alloy member 150, in the martensite phase, is deformed and disposed at least partially into the first recess 101R or the second recess 102R (FIG. 8, Block 803) to provide support for the core composite laminate 100 during curing. For example, the shape memory allow member 150 is positioned in the first recess 101R and/or the second recess 102R to support the walls 110W defining the cavity 110 during curing of the cored composite laminate 100. For example, in one aspect, illustrated in FIG. 7, the shape memory alloy member 150 may be disposed into one of the first or second recess 101R, 102R before the first and second layers 101, 102 are coupled, such that the shape memory alloy member 150 is already disposed in the cavity 110 when the cavity 110 is formed by coupling the first layer 101 to the second layer 102. The first layer 101 and the second layer 102 of the cored composite laminate 100 are coupled together, so that the first recess 101R and the second recess 102R form the cavity 110 with the shape memory alloy member 150 disposed therein (FIG. 8, Block 804). In one aspect, the skin 101SS, 102SS is coupled to at least one of the first and second coupling surfaces 101CS, 102CS of each of the first layer 101 and the second. layer 102 of the cored composite laminate 100. The first and second layers 101, 102 with the shape memory alloy member 150 disposed in the cavity 110 are cured to form the cored composite laminate 100.

In one aspect, as the temperature during curing reaches a predetermined transition temperature (i.e., the predetermined transition temperature of, e.g., 130 degrees Fahrenheit (about 54 degrees Celsius) or any other suitable temperature, to transition the shape memory alloy member 150 from the martensite phase to the austenite phase), the shape memory alloy member 150 transitions to a predetermined austenite shape (see, e.g., the helically coiled wire 150WC (FIGS. 1 and 4A-4B), the shape memory alloy elements 150AE1-150AEn having a diameter ED2 (FIGS. 5B-5C), or the one or more shape memory alloy elements 150SM1-150SM2 spacing the plates 150P distance PH2 (FIG. 6B)). In one aspect the predetermined transition temperature is independent of a curing temperature for curing the first layer 101 to the second layer 102 so that the shape memory alloy member 150 transitions from the martensite phase to the austenite phase to support the walls 110W of the cavity 110 before the curing temperature is reached. In other aspects, the transition temperature may be substantially exact to the curing temperature.

When the shape memory alloy member 150 transitions to the predetermined austenite shape, the shape memory alloy member engages and supports the first surface 101S1 and the second surface 102S2 (i.e., inner walls) of the cavity 110 (FIG. 8, Block 805). The shape memory alloy member 150 supports the first surface 101S1 and the second surface 102S2 of the cavity 110, so that the first surface 101S1 and the second surface 102S2 are substantially prevented from collapsing or deforming from within the cavity 110.

In one aspect, the curing of the first and second layer 101, 102 is an autoclave curing process. As noted above, the core composite laminate 100 is formed by at least coupling the first layer 101 and the second layer 102 to each other. In one aspect, the autoclave curing process may include one or more of placing the cored composite laminate 100 in a vacuum, applying heat to the cored composite laminate 100, and/or placing the cored composite laminate 100 under compression. For example, the curing process may utilize vacuum, heat, and pressure; just heat and pressure; just heat; or any other suitable combination of the vacuum, heat, and pressure to cure the cored composite laminate 100. One or more of the vacuum, heat, and pressure may occur while the first layer 101 is held against the second layer 102 to bond the first layer 101 and the second layer 102 to one another by curing a bonding agent, e.g., glue, epoxy, or any other chemical bonding agent.

In one aspect, after curing the cored composite laminate 100, the shape memory alloy member 150 and cored composite laminate 100 are cooled, artificially or naturally, to the predetermined transition temperature or any other suitable temperature below the transition temperature, such as, room temperature. As the shape memory alloy member 150 and cored composite laminate 100 are cooled and reach the predetermined transition temperature, the shape memory alloy member 150 transitions from the predetermined austenite shape to the martensite phase at the predetermined transition temperature.

In one aspect, while cooling past the predetermined transition temperature, the shape memory alloy member 150 disengages the first surface 101S1 and the second surface 102S2 of the cavity 110, so that a clearance exists between the shape memory alloy member 150 and the first surface 101S1 and the second surface 102S1. After cooling, the shape memory alloy member 150 is deformed to remove the shape memory alloy member 150 from the cavity 110 of the cored composite laminate 100.

In one aspect, as illustrated in FIG. 9, the shape memory alloy member 150 configured as the wire 150W is removed by pulling the wire 150W from the cavity 110 where the wire 150W is substantially straightened while being pulled through the cavity 110 for removal. In other aspects, the flexible tube 150F may be pulled from the cavity 110 after the shape memory alloy elements 150AE1-150AEn transition from larger diameter ED2 to smaller diameter ED1 (FIGS. 5A-5B) so that the shape memory alloy elements 150AE1-150AEn are no longer engaged with the first and second surfaces 101S1, 102S2. In yet another aspect, the plates 150P coupled to each other with one or more shape memory alloy elements 150SM1-150SM2 may be pulled from the cavity 110 after the one or more shape memory alloy elements 150SM1-150SM2 transition from distance PH2 to smaller distance PH1 (FIGS. 6A6B), so that the one or more shape memory alloy elements 150SM1-150SM2 are no longer engaged with the first and second surfaces 101S1, 102S2. In one aspect, after removal, the shape memory alloy member 150 may be reused to support a cavity of a different cored composite laminate.

Examples of the present disclosure may be described in the context of aircraft manufacturing and service method 1000 as shown in FIG. 10. In other aspects, the examples of the present disclosure may be applied in any suitable industry, such as e.g. automotive, maritime, aerospace, etc. With respect to aircraft manufacturing, during pre-production, illustrative method 1000 may include specification and design (block 1002) of aircraft 1100 (FIG. 11) and material procurement (block 1004). During production, component and subassembly manufacturing (block 1006) and system integration (block 1008) of aircraft 1100 may take place. Thereafter, aircraft 1100 may go through certification and delivery (block 1010) to be placed in service (block 1012). While in service, aircraft 1100 may be scheduled for routine maintenance and service (block 1014). Routine maintenance and service may include modification, reconfiguration, refurbishment, etc. of one or more systems of aircraft 1100 that may include the cored composite laminate 100 as described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (block 1006) may be fabricated or manufactured in a manner similar to components or subassemblies produced while aircraft 1100 is in service (block 1012). In a particular embodiment, the cored composite laminate 100 is fabricated or manufactured and assembled into aircraft 1100 (block 1006). Accordingly, one or more examples of the apparatus(es), method(s), or combination thereof may be utilized during production stages 1006 and 1008, for example, by substantially expediting assembly of or reducing the cost of aircraft 1100. Similarly, one or more examples of the apparatus or method realizations, or a combination thereof, may be utilized, for example and without limitation, while aircraft 1100 is in service (block 1012) and/or during maintenance and service (block 1014).

The following are provided in accordance with the aspects of the present disclosure:

A1. A method of forming a cored composite laminate, the method comprising:

forming a first recess in a first coupling surface of a first layer of the cored composite laminate;

forming a second recess in a second coupling surface of a second layer of the cored composite laminate so that when the first layer of the cored composite laminate and the second layer of the cored composite laminate are coupled, the first recess and the second recess form a cavity through the cored composite laminate; and disposing a shape memory alloy member in the cavity, so that the shape memory alloy member supports the cored composite laminate during curing of the cored composite laminate.

A2. The method of paragraph A1, further comprising deforming the shape memory alloy member for disposing the shape memory alloy member in the cavity.

A3. The method of paragraph A2, further comprising returning the shape memory alloy member to a predetermined austenite shape at a predetermined temperature during cored composite laminate curing.

A4. The method of paragraphs A1-A3, further comprising transitioning the shape memory alloy member from a predetermined austenite shape, in which the shape memory alloy member supports the cored composite laminate during curing, to a martensite phase by cooling the cored composite laminate after curing of the cored composite laminate.

A5. The method of paragraphs A1-A4, further comprising disposing the shape memory alloy member at least partially into one of the first recess and the second recess prior to coupling the first coupling surface with the second coupling surface.

A6. The method of paragraph A5, wherein the shape memory alloy member comprises a helically coiled wire, where disposing the shape memory alloy member at least partially into one of the first recess and the second recess comprises deforming the shape memory alloy member to a shape of the one of the first recess and the second recess.

A7. The method of paragraph A5, wherein the shape memory alloy member comprises plates coupled to each other with shape memory elements, where disposing the shape memory alloy member at least partially into one of the first recess and the second recess comprises deforming the shape memory alloy member to a shape of the one of the first recess and the second recess.

A8. The method of paragraph A5, wherein the shape memory alloy member comprises a flexible tube and an array of shape memory alloy elements disposed along a length of the flexible tube, where disposing the shape memory alloy member at least partially into one of the first recess and the second recess comprises deforming the shape memory alloy member to a shape of the one of the first recess and the second recess.

A9. The method of paragraphs A1-A8, further comprising deforming the shape memory alloy member for removal from the cavity.

A10. The method of paragraphs A1-A9, further comprising pulling the shape memory alloy member from the cavity after the first coupling surface is coupled to the second coupling surface.

A11. The method of paragraphs A1-A10, wherein the first layer and the second layer of the cored composite laminate are foam panels, where disposing the shape memory alloy member in the cavity, so that the shape memory alloy member supports the cored composite laminate during curing of the cored composite laminate comprises substantially preventing deformation of the foam panels from within the cavity.

A12. The method of paragraphs A1-A11, wherein the cored composite lamina curing comprises an autoclave curing process.

A13. The method of paragraphs A1-A12, further comprising coupling a skin to a surface of each of the first layer and the second layer of the cored composite laminate, each respective surface being opposite a respective one of the first coupling surface and the second coupling surface.

B1. A method of forming a cored composite laminate having at least a first layer and a second layer of a compressible material, the method comprising:
disposing a shape memory alloy member into a cavity formed by the first layer and the second layer;
heating the first layer, the second layer, and the shape memory alloy member, where the shape memory alloy member is configured so that as the shape memory alloy member is heated, the shape memory alloy member engages and supports inner walls of the cavity; and
removing the shape memory alloy member from the cavity after cooling the first layer, the second layer, and the shape memory alloy member.

B2. The method of paragraph B1, wherein when cooled the shape memory alloy member disengages the inner walls of the cavity so that a clearance exists between the shape memory alloy member and the inner walls.

B3. The method of paragraphs B1-B2, wherein heating the first layer and the second layer cures the first layer to the second layer.

B4. The method of paragraph B3, further comprising compressing the first layer and the second layer against each other with the shape memory alloy member disposed therebetween.

B5. The method of paragraph B4, wherein heating and compressing are an autoclave cure cycle process.

B6. The method of paragraphs B1-B5, further comprising transitioning the shape memory alloy member from a predetermined austenite shape, in which the shape memory alloy member engages and supports the inner walls of the cavity, to a martensite phase during cooling of the first layer, the second layer, and the shape memory alloy member.

B7. The method of paragraphs B1-B6, further comprising, deforming the shape memory alloy member for disposing the shape memory alloy member into the cavity.

B8. The method of paragraphs B1-B7, wherein the shape memory alloy member comprises a helically coiled wire, where disposing the shape memory alloy member into the cavity comprises deforming the shape memory alloy member to a shape of the cavity.

B9. The method of paragraphs B1-B7, wherein the shape memory alloy member comprises plates coupled to each other with shape memory elements, where disposing the shape memory alloy member into the cavity comprises deforming the shape memory alloy member to a shape of the cavity.

B10. The method of paragraphs B1-B7, wherein the shape memory alloy member comprises a flexible tube and an array of shape memory alloy delimits disposed along a length of the flexible tube, where disposing the shape memory alloy member into the cavity comprises deforming the shape memory alloy member to a shape of the cavity.

B11. The method of paragraphs B1-B10, further comprising deforming the shape memory alloy member for removing the shape memory alloy member from the cavity after cooling.

B12. The method of paragraphs B1-B11, wherein removing the shape memory alloy member from the cavity after cooling comprises pulling the shape memory alloy member from the cavity.

B13. The method of paragraphs B1-B12 wherein the first layer and the second layer of the cored composite laminate are foam panels, where supporting the inner walls of the cavity with the shape memory alloy member comprises substantially preventing deformation of the foam panels from within the cavity.

C1. A method for internally supporting a cored composite laminate having at least a first layer and a second layer of compressible material, the method comprising:
disposing a shape memory alloy member into a cavity formed by the first layer and the second layer; and
heating the cored composite laminate and the shape memory alloy member so that the shape memory alloy member engages and supports inner walls of the cavity as the first layer and the second layer are compressed to engage each other in a curing process.

C2. The method of paragraph C1, wherein heating the cored composite laminate cures the first layer to the second layer.

C3. The method of paragraph C2, wherein a transition temperature for the shape memory alloy member, so that the shape memory alloy member engages and supports the inner walls of the cavity, is independent of a cure temperature for curing the first layer to the second layer.

C4. The method of paragraphs C1-C3, wherein the curing process is an autoclave cure cycle process.

C5. The method of paragraphs C1-C4, further comprising cooling the shape memory alloy member so that the shape memory alloy member transitions to a martensite phase during cooling.

C6. The method of paragraphs C1-C5, further comprising deforming the shape memory alloy member for disposing the shape memory alloy member into the cavity.

C7. The method of paragraphs C1-C5, wherein the shape memory alloy member comprises a helically coiled wire, where disposing the shape memory alloy member into the cavity comprises deforming the shape memory alloy member to a shape of the cavity.

C8. The method of paragraphs C1-C5, wherein the shape memory alloy member comprises plates coupled to each other with shape memory elements, where disposing the shape memory alloy member into the cavity comprises deforming the shape memory alloy member to a shape of the cavity.

C9. The method of paragraphs C1-C5 wherein the shape memory alloy member comprises a flexible tube and an array of shape memory alloy elements disposed along a length of the flexible tube, where disposing the shape memory alloy member into the cavity comprises deforming the shape memory alloy member to a shape of the cavity.

C10. The method of paragraphs C1-C9, further comprising deforming the shape memory alloy member for removing the shape memory alloy member from the cavity.

C11. The method of paragraphs C1-C10, further comprising pulling the shape memory alloy member from the cavity.

C12. The method of paragraphs C1 to C11, wherein the first layer and the second layer of the cored composite laminate are foam panels, where supporting the inner walls of the cavity with the shape memory alloy member comprises substantially preventing deformation of the foam panels from within the cavity.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 8 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or hither-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be

What is claimed is:

1. A method of forming a cored composite laminate, which comprises at least a first layer of compressible material and a second layer of compressible material, the method comprising:
   forming a first recess in a first coupling surface of the first layer of compressible material;
   forming a second recess in a second coupling surface of the second layer of compressible material so that when the first layer of compressible material and the second layer of compressible material are coupled, the first recess and the second recess form a cavity through the cored composite laminate; and
   disposing a shape memory alloy member in the cavity, so that when the first layer of compressible material, the second layer of compressible material of the cored composite laminate, and the shape memory alloy member are heated during curing, the shape memory alloy member supports inner walls of the cavity through the cored composite laminate, and wherein the shape memory alloy member is malleable in a martensite phase so as to effect passage and removal of the shape memory alloy member through one or more curved paths, defined by the cavity through the cored composite laminate after the cored composite laminate has been cooled post-curing.

2. The method of claim 1, further comprising deforming the shape memory alloy member for positioning the shape memory alloy member in the cavity.

3. The method of claim 2, further comprising returning the shape memory alloy member to a predetermined austenite shape at a predetermined temperature during cored composite laminate curing.

4. The method of claim 1, further comprising disposing the shape memory alloy member at least partially into one of the first recess and the second recess prior to coupling the first coupling surface with the second coupling surface.

5. The method of claim 1, further comprising deforming the shape memory alloy member for removal from the cavity.

6. The method of claim 1, further comprising pulling the shape memory alloy member from the cavity after the first coupling surface is coupled to the second coupling surface.

7. The method of claim 1, wherein the first layer of compressible material and the second layer of compressible material are foam panels, where positioning the shape memory alloy member in the cavity, so that the shape memory alloy member supports the cored composite laminate during curing of the cored composite laminate comprises substantially preventing deformation of the foam panels from within the cavity.

8. The method of claim 1, further comprising coupling a skin to a surface of each of the first layer of compressible material and the second layer of compressible material, each respective surface being opposite a respective one of the first coupling surface and the second coupling surface.

9. A method of forming a cored composite laminate, comprising at least a first layer of compressible material and a second layer of compressible material, the method comprising:
   disposing a shape memory alloy member into a cavity formed by the first layer of compressible material and the second layer of compressible material;
   heating the first layer of compressible material, the second layer of compressible material, and the shape memory alloy member, where the shape memory alloy member is configured so that as the shape memory alloy member is heated, the shape memory alloy member engages and supports inner walls of the cavity; and
   removing the shape memory alloy member from the cavity after cooling the first layer of compressible material, the second layer of compressible material, and the shape memory alloy member, where the shape memory alloy member is malleable in a martensite phase so as to effect passage of the shape memory alloy member through one or more curved paths defined by the cavity.

10. The method of claim 9, further comprising transitioning the shape memory alloy member from a predetermined austenite shape, in which the shape memory alloy member engages and supports the inner walls of the cavity, to the martensite phase during cooling of the first layer of compressible material, the second layer of compressible material, and the shape memory alloy member.

11. The method of claim 9, wherein heating the first layer of compressible material and the second layer of compressible material cures the first layer to the second layer.

12. The method of claim 11, further comprising compressing the first layer of compressible material and the second layer of compressible material against each other with the shape memory alloy member disposed therebetween.

13. The method of claim 12, wherein heating and compressing are an autoclave cure cycle process.

14. The method of claim 9, wherein the shape memory alloy member comprises a helically coiled wire, where disposing the shape memory alloy member into the cavity comprises deforming the shape memory alloy member to a shape of the cavity.

15. The method of claim 9, wherein the shape memory alloy member comprises plates coupled to each other with shape memory elements, where disposing the shape memory alloy member into the cavity comprises deforming the shape memory alloy member to a shape of the cavity.

16. The method of claim 9, wherein the shape memory alloy member comprises a flexible tube and an array of shape memory alloy elements disposed along a length of the flexible tube, where disposing the shape memory alloy member into the cavity comprises deforming the shape memory alloy member to a shape of the cavity.

17. A method for internally supporting a cored composite laminate, comprising at least a first layer of compressible material and a second layer of compressible material, the method comprising:
   disposing a shape memory alloy member into a cavity formed by the first layer of compressible material and the second layer of compressible material, the shape memory alloy member being deformed during insertion of the shape memory alloy member into the cavity so that the shape memory alloy member is bent, during insertion, to conform to a shape of the cavity; and heating the cored composite laminate and the shape memory alloy member so that the shape memory alloy member engages and supports inner walls of the cavity as the first layer of compressible material and the second layer of compressible material are compressed to engage each other in a curing process.

18. The method of claim 17, wherein heating the cored composite laminate cures the first layer of compressible material to the second layer of compressible material.

19. The method of claim 18, wherein a transition temperature for the shape memory alloy member, so that the shape memory alloy member engages and supports the inner walls of the cavity, is independent of a cure temperature for curing the first layer of compressible material to the second layer of compressible material.

20. The method of claim 17, further comprising cooling the shape memory alloy member so that the shape memory alloy member transitions to a martensite phase during cooling, the shape memory alloy member being malleable in the martensite phase.

* * * * *